April 12, 1938.  A. G. BADE  2,114,245
VARIABLE SPEED TRANSMISSION
Filed Jan. 18, 1937  2 Sheets-Sheet 1
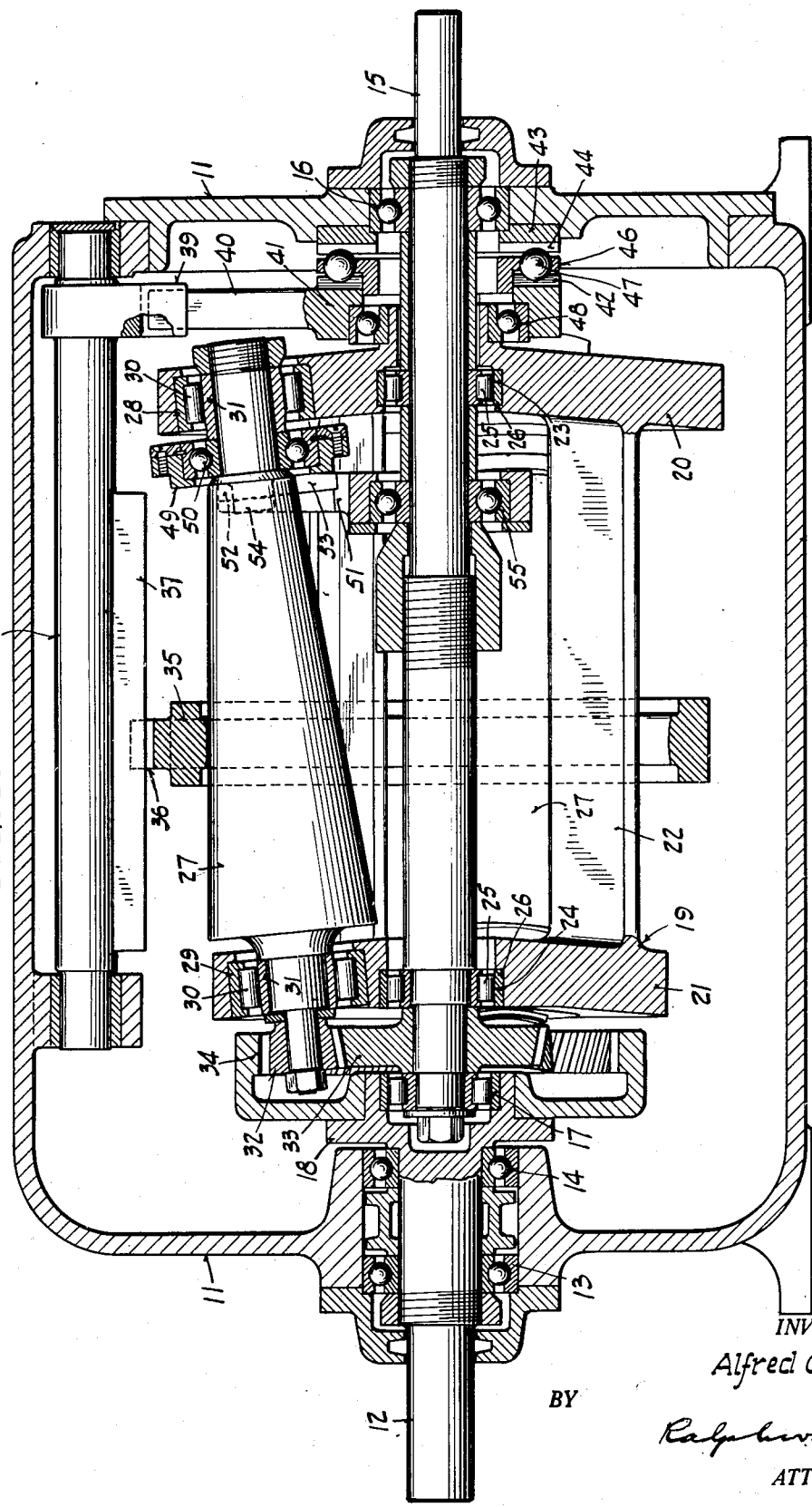
INVENTOR.
Alfred G. Bade
BY
Ralph Lewstrom
ATTORNEY.

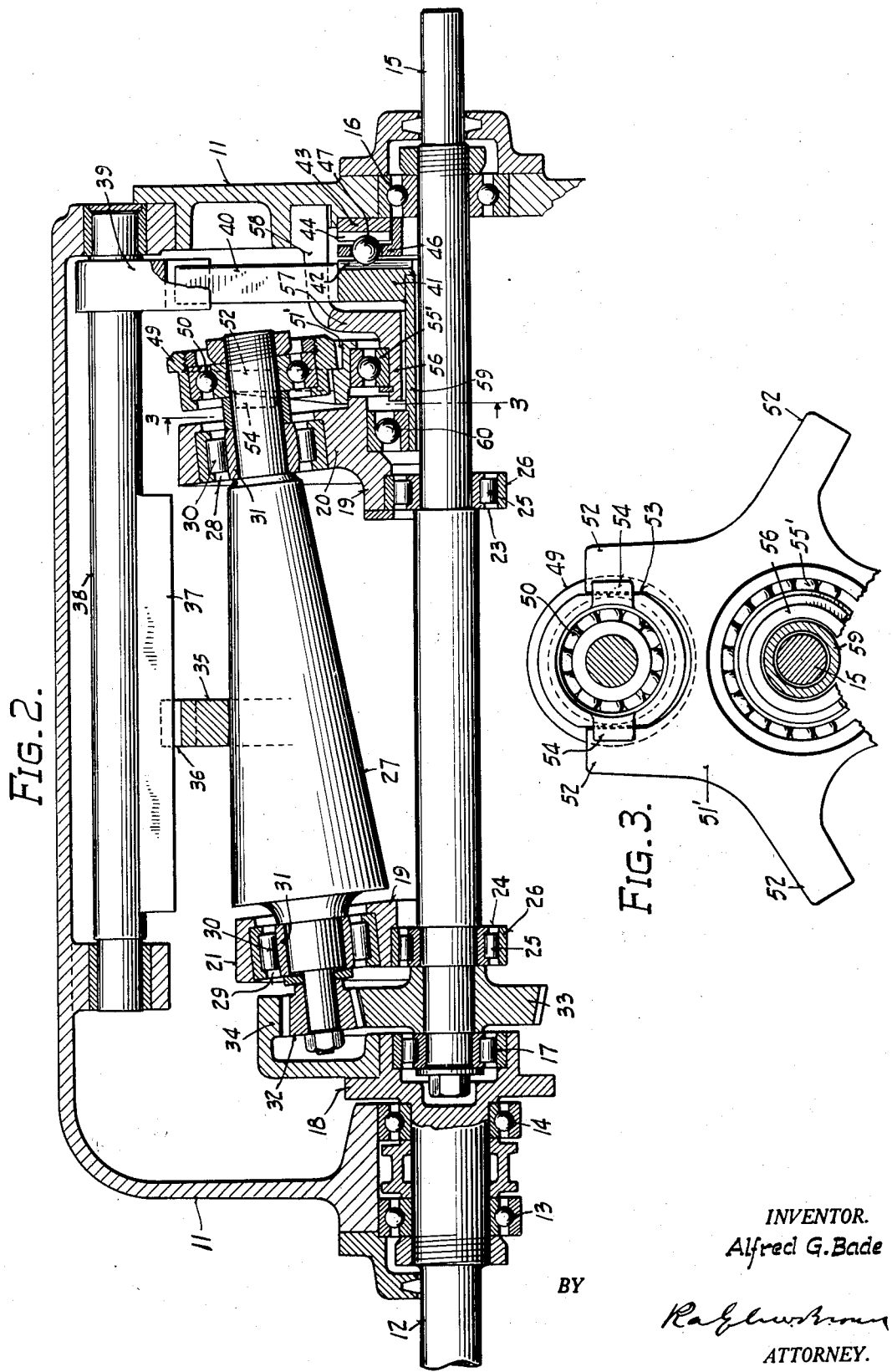

Patented Apr. 12, 1938

2,114,245

UNITED STATES PATENT OFFICE 2,114,245

VARIABLE SPEED TRANSMISSION

Alfred G. Bade, Milwaukee, Wis., assignor to The Falk Corporation, Milwaukee, Wis., a corporation of Wisconsin Application January 18, 1937, Serial No. 121,110

11 Claims. (Cl. 74—281)

This invention relates to variable speed transmissions of the type involving a set of inclined tapered planet rollers and a contact ring adjustable lengthwise thereof to regulate their planetary action.

A variable speed transmission of this type, which has proven commercially successful, is disclosed in the copending application of myself and Walter P. Schmitter, Serial No. 52,095, filed November 29, 1935. In the transmission therein described, the planetary action of the rollers is controlled by a ring which encircles and contacts the rollers, the required contact pressures between the rollers and the control ring being maintained by a pressure inducing device which functions to force the rollers along their outwardly inclined axes. This entails lengthwise movement of the rollers against the frictional resistance of the control ring, a resistance which increases as the contact pressures increase and which limits the degree of contact pressures which may be developed. This condition also interferes with the normal positioning and control of the ring with respect to the rollers.

An object of the present invention is to provide a transmission of the character described in which the inclination of the roller axes is utilized to attain outward movement of the rollers without axial shift of the rollers themselves. This I attain by holding the rollers against axial movement, and shifting axially the carrier in which the rollers are mounted.

Another object is to provide an improved means for developing the required contact pressures.

Another object is to simplify the transmission and its pressure inducing device.

Other objects and advantages will appear, either expressed or implied from the following description of an illustrative embodiment of the present invention.

In the accompanying drawings:—

Figure 1 is a longitudinal sectional view of a variable speed transmission embodying the present invention.

Fig. 2 is a longitudinal sectional view of a portion of a second variable speed transmission embodying this invention.

Fig. 3 is a view upon the line 3—3 of Fig. 2 showing the mechanism for holding the rollers.

The variable speed transmission shown in the drawings is somewhat similar to that described in the application identified above. It is enclosed in a housing 11 and includes a driven shaft 12 journalled in bearings 13 and 14 in one end of the housing. A drive shaft 15 aligned with the driven shaft 12 is journalled in a bearing 16 at the opposite end of the housing 11 and in a bearing 17 mounted in a head 18 formed on the end of a driven shaft 12.

Surrounding the drive shaft 15 within the housing 11 is a rotor 19 comprising a disk or head 20 and a second disk or head 21, rigidly connected by bars 22, preferably T-shaped in cross-section. The head 20 is mounted by means of a bearing 23 upon the drive shaft 15, and the disk 21 is mounted by a bearing 24 upon the opposite end of the drive shaft 15. It will be noted that in each of these bearings 23 and 24 the outer race 26 is free to slide lengthwise along the rollers 25. With bearings of this type, the rotor 19 is freely rotatable about the axis of the shafts 12 and 15, and at the same time is free to shift, with the outer races 26 of the bearings, axially of these shafts.

Carried by the rotor 19 is a set of tapered planetary rollers 27 in any convenient number; three such rollers, as shown in the drawings, have been found to produce satisfactory results. These tapered rollers are mounted in an inclined position so that their outer edges are substantially parallel to the common axis of the shafts 12 and 15 and so that the axes of the rollers, if extended, would meet at a common apex on the extended axis of the shafts 12 and 15.

The ends of the rollers 27 are mounted in the rotor 19 by bearings 28 in the head 20, and bearings 29 in the disk 21. Like the central bearings of the rotor, these bearings 28 and 29 are axially adjustable, their rollers 30 being slidable upon their inner race 31. By this means, the rotor 19 may be moved axially relative to the rollers 27.

Upon the end of each of the rollers 27 is fixed a pinion 32. These pinions 32 constitute a set of planet gears which engage with and revolve about a sun gear 33 fixed to the drive shaft 15. The planet pinions 32 also are engaged with an internally toothed ring gear 34 affixed to the head 18 of the driven shaft 12. The internal gear 34, the planet pinions 32 and the sun gear 33 are preferably so formed as to provide excess clearance at the bases of their teeth, so as to permit slight outward movement of the rollers 27 and their pinions 32 without objectionable interference.

The rollers 27 and the pinions 32 are rotated upon their axes by engagement of the pinions with the sun gear 33 upon the drive shaft 15. From this rotary motion, planetary movement of the rollers about the drive shaft 15 is also induced by rolling contact of the rollers 27 with a control ring 35. The control ring 35 encircles and contacts all of the rollers 27, and by movement along the rollers axially of the rotor 19 serves to regulate and govern the planetary action of the rollers.

To create contact pressure between the rollers and the ring, I utilize the force of the reaction between the rollers 27 and the control ring. The control ring 35 is so mounted that it is restrained from rotation with the rollers solely by either of two lugs 36, disposed against and at opposite sides of a fin 37 formed on a rock-shaft 38 journalled in the housing 11. The rock shaft 38 also carries at one end a lug 39 bifurcated to engage a lever 40 extending outwardly from a cam ring 41 surrounding the central shaft 15. By this arrangement of levers, the tendency to rotate which is set up in the ring 35 by reaction of the rollers 27 is transmitted to the fin 37, tending to rock the shaft 38 and thus operate through the lever 40 to turn the ring 41 about the axis of the shaft 15.

Upon the surface of the cam ring 41, adjacent the housing 11, are fashioned a series of V-shaped radial grooves 42. Upon a stationary cam ring 43, fixed to the adjacent portion of the housing 11, are formed a correspoding series of similar grooves 44. Between the cam rings 41 and 43 is interposed a cage 46 containing a series of balls 47 which rest within the grooves 42 and 44. Upon application of a turning force to the ring 41 by the lever 40, the cam action of the balls 47 against the inclined surfaces of the opposed grooves 42 and 44 operates to translate the turning force into an axial thrust upon the ring 41.

The ring 41 is mounted upon the rotor 19 by a bearing 48 which not only permits free rotation of the rotor within the ring 41, but which also serves to transmit the axial thrust from the ring 41 to the rotor 19, thus resulting in axial movement of the rotor upon the bearings 23 and 24.

The rollers 27, however, are restrained from movement with the rotor 19. For this purpose the shaft of each roller is encircled by a collar 49 mounted thereon by a bearing 50 in such manner that the roller cannot move axially within the collar. A disk or spider 51 surrounding the central shaft projects outwardly toward the rollers, and has two fingers 52 bearing against each of the collars 49. A projection from the collar passes through a slot 53 formed between the two fingers 52, and carries two lugs 54, each engaging one of the fingers 52 upon its opposite side so that the collar 49 is slidable within the groove 53, but is retained within the groove. The spider 51 is mounted upon the drive shaft 15 by a bearing 55 and is secured against movement axially of the shaft 15. In this way the rollers 27 are securely restrained against axial movement, but are free to move outwardly from the axis of the shaft 15.

In the form of the transmission described above and shown in Fig. 1 of the drawings, the collar 49 is mounted upon the shaft of each roller 27 inside of the head 20 of the rotor 19. In the variation shown in Fig. 2 of the drawings, however, the corresponding collar is placed upon the roller shaft beyond the head 20. In such case the spider 51′, instead of being mounted directly upon the drive shaft 15, is mounted by its bearing 55′ on a tubular hub portion 56 of a cage 57 surrounding the shaft 15 and secured to the housing 11. The cam mechanism for moving the rotor is in this instance contained within the cage 57, the lever 40 extending upwardly through a slot 58 formed in the cage 57. The axial thrust from the cam mechanism is transmitted from the ring 41 to the rotor 19 by a sleeve 59, surrounding the drive shaft 15 within the hub portion 56, and by a thrust bearing 60 between the sleeve 59 and rotor.

In both forms of the transmission shown, axial movement of the rotor 19 induces outward movement of the rollers 27, due to the inclination of the axes of the rollers. Since the surface of the inner races 31 of the bearings 28 and 29 is parallel to the axis of the rollers 27, axial movement of the rotor 19, while the rollers 27 are restrained against such movement, will cause the rollers 30 of the bearings to slide upon their inner races and thus partake of a wedge-like action tending to force the rollers 27 outwardly against the control ring 35.

It is of course understood that power will be transmitted through this transmission in a manner similar to that of the application above identified. Rotation of the drive shaft 15 and the sun gear 33 causes the pinions 32 and the rollers 27 to revolve on their axes and to partake of a planetary movement around the drive shaft 15. This planetary motion is induced and governed by rolling contact of the rollers 27 against the control ring 35. The combined movement of the planetary rollers 32 is transmitted through the ring gear 34 to cause rotation of the driven shaft 12. Since the planetary action of the rollers 27 varies as the control ring 35 is shifted axially of the transmission, the speed of the driven shaft 12 will thus be varied correspondingly, while the speed of the driving shaft 15 remains constant.

Various changes may be made in the embodiments of the present invention hereinabove specifically described without departing from or sacrificing the advantages of the invention as defined in the appended claims.

I claim:—

1. In a variable speed transmission the combination of a plurality of tapered relatively inclined planetary rollers, a control member frictionally engaged with said rollers and moveable lengthwise thereof, a rotary carrier for said rollers axially moveable relative to said rollers, and means responsive to axial movement of said carrier for forcing said rollers into pressure contact with said member.

2. In a variable speed transmission the combination of a plurality of relatively inclined planetary rollers, a control member encircling and contacting said rollers and moveable lengthwise thereof to regulate the speed ratio of the transmission, a rotary carrier in which said rollers are journalled, and means mounting said carrier for axial movement relative to said rollers.

3. In a variable speed transmission the combination of a plurality of tapered relatively inclined planetary rollers, a control ring encircling and contacting said rollers and moveable lengthwise thereof to regulate the speed ratio of the transmission, a carrier for said rollers axially moveable relative thereto, and means restraining said rollers against axial movement with said carrier.

4. In a variable speed transmission the combination of an axially moveable rotary carrier, a plurality of tapered relatively inclined planetary rollers rotatable with and with respect to said carrier and restrained against axial movement with the latter, a control ring encircling said rollers, and means responsive to axial movement of said carrier relative to said rollers for developing contact pressures between said rollers and ring.

5. In a variable speed transmission the combination of an axially moveable rotary carrier, a plurality of tapered planetary rollers journalled in said carrier for rotation about axes inclined relative to the axis of rotation of said carrier and restrained against axial movement with said carrier, and a control ring encircling and contacting said rollers and moveable lengthwise thereof to regulate the speed ratio of the transmission.

6. In a variable speed transmission the combination of an axially moveable rotary carrier, a plurality of tapered relatively inclined planetary rollers rotatable with and with respect to said carrier and restrained against axial movement with the latter, a control ring encircling and contacting said rollers and moveable lengthwise thereof to regulate the speed ratio of the transmission, and means urging said carrier to move axially relative to said rollers.

7. In a variable speed transmission the combination of an axially moveable rotary carrier, a plurality of tapered relatively inclined planetary rollers rotatable with and with respect to said carrier and radially moveable in response to axial movement of said carrier, a control ring encircling and contacting said rollers and moveable lengthwise thereof to regulate the speed ratio of the transmission, and means urging axial movement of said carrier to thereby effect development of contact pressures between said rollers and ring.

8. In a variable speed transmission the combination of an axially moveable rotary carrier, a plurality of tapered relatively inclined planetary rollers rotatable with and with respect to said carrier and radially moveable in response to axial movement of said carrier, a control ring encircling and contacting said rollers and moveable lengthwise thereof to regulate the speed ratio of the transmission, and torque responsive means acting on said carrier to effect development of contact pressures between said rollers and ring.

9. In a variable speed transmission the combination of an axially moveable rotary carrier, a plurality of tapered relatively inclined planetary rollers rotatable with and with respect to said carrier and radially moveable in response to axial movement of said carrier, a control ring encircling and contacting said rollers and moveable lengthwise thereof to regulate the speed ratio of the transmission, and means responsive to the torque load on said ring for urging said carrier to move axially.

10. In a variable speed transmission the combination of a rotary carrier, a plurality of tapered relatively inclined planetary rollers rotatable with and with respect to said carrier, said rollers and carrier being relatively axially moveable and also relatively radially moveable in response to relative axial movement therebetween, a control ring encircling and contacting said rollers and moveable lengthwise thereof to regulate the speed ratio of the transmission, and means responsive to the torque load on said ring for inducing relative axial movement between said rollers and carrier.

11. In a variable speed transmission the combination of a rotary carrier, a plurality of tapered relatively inclined planetary rollers rotatable with and with respect to said carrier and radially moveable in response to relative axial movement between said rollers and carrier, a non-rotating control ring encircling and contacting said rollers and moveable lengthwise thereof to regulate their motion, driven means responsive to the motion of said rollers, and a pressure device responsive to the torque load on the transmission for inducing relative axial movement between said rollers and carrier.

ALFRED G. BADE.